United States Patent Office 3,119,998
Patented Jan. 28, 1964

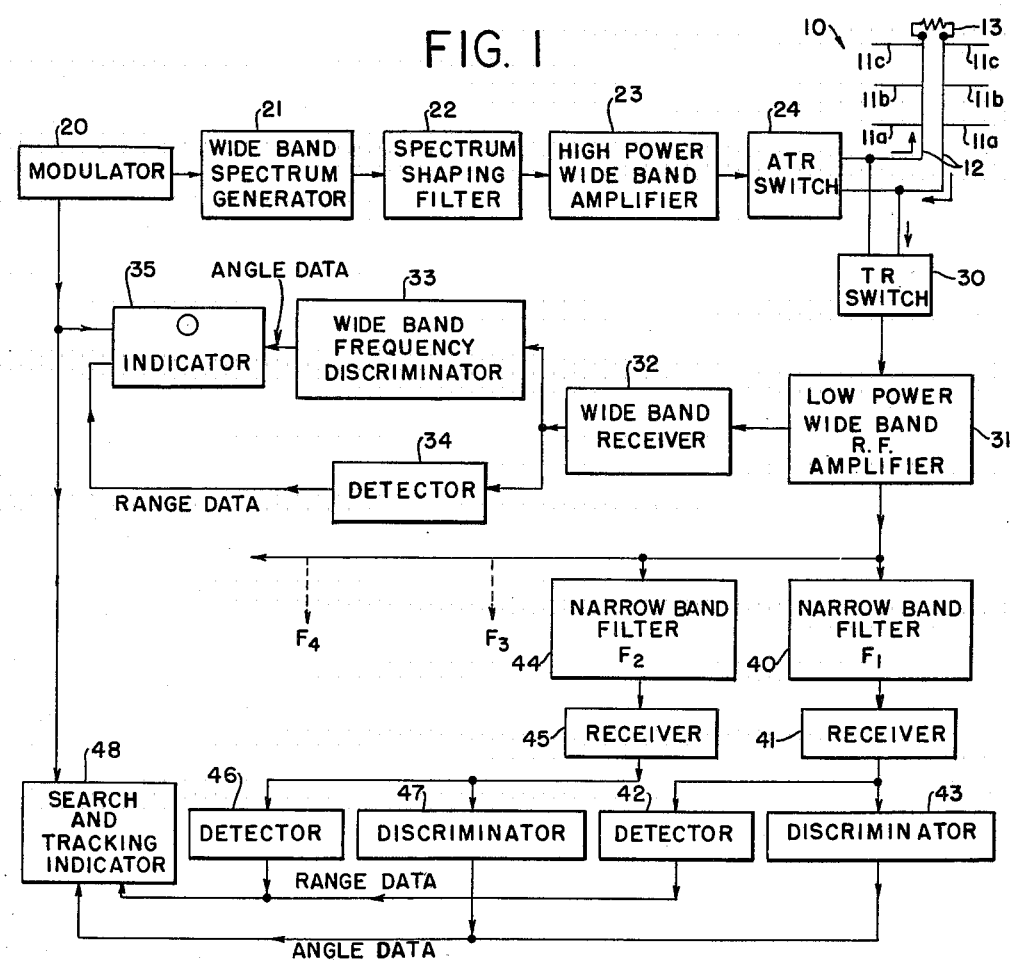
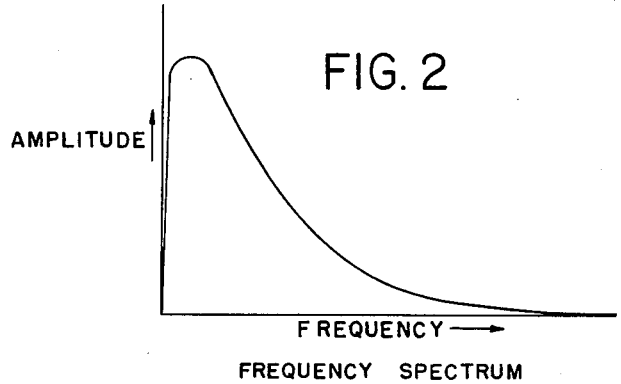
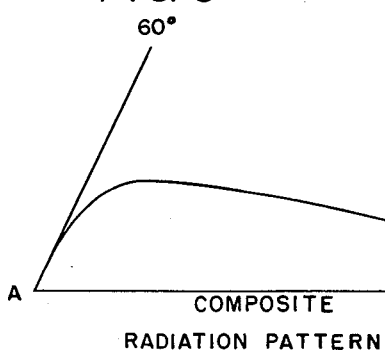

3,119,998
OBJECT LOCATING SYSTEMS
William V. Foley, Denver, Colo., assignor to Martin-Marietta Corporation, a corporation of Maryland
Filed Sept. 21, 1956, Ser. No. 611,221
3 Claims. (Cl. 343—16)

The present invention relates to systems employing radiant energy to locate an object, and more particularly to a method and apparatus for developing a non-scanning radiation pattern capable of indicating the position of an object located therewithin.

Conventional locating systems search out an object by energizing an antenna to produce a sharply focused radiation beam, and then scanning the beam through an angle of radiation coverage. In such a system the angular position of the object relative to the antenna is indicated by the direction in which the radiation beam is pointing at the time an echo signal is reflected.

It is the purpose of the present invention to provide a non-scanning radiation pattern which simultaneously extends through a selected angle of radiation coverage and yet is capable of accurately indicating the position of an object located therewithin.

To this end the invention employs an antenna of the frequency directive type. Such an antenna produces a sharply focused radiation beam when energized by a signal oscillating at a frequency within the antenna characteristic. In addition the direction in which the radiation beam is pointing is directly related to the frequency of the energizing signal and changes in response to a change in the frequency thereof.

In accordance with the method of the present invention the frequency directive antenna is energized with a composite signal comprising a spectrum of different frequency increment signals. The increment signals thus simultaneously energize the antenna to produce a plurality of sharply focused incremental radiation beams which are differently directed in accordance with the frequency directive characteristic of the antenna. In this manner a composite radiation pattern is formed by the combination of incremental radiation beams. It should also be noted that the angle of coverage and range of the composite radiation pattern are determined by the frequency spread and amplitudes, respectively, of the increment signals and may therefore be controlled by shaping of the energizing spectrum.

With such a composite radiation pattern the echo signal reflected from an object will have a frequency dependent upon the frequency of the energy radiated by the incremental radiation beam within which the object is located. Thus, in accordance with the invention, the angular position of an object relative to the antenna is provided by producing an indication representative of the frequency of the echo signal reflected therefrom.

The present invention provides electrical transmitting apparatus for generating a spectrum of different frequency signals and for simultaneously coupling the signals to the frequency directive antenna. Advantageously the transmitting apparatus is provided with a spectrum shaping filter including adjustable means for varying its attenuation characteristic. In this way the frequency spread and amplitude envelope of the energizing spectrum may be varied to selectively change the shape of the composite radiation pattern produced thereby.

Electrical receiving apparatus responsive to the echo signals reflected from an object located within the composite radiation pattern is also provided by the invention. The receiving apparatus includes an indicating device adapted to produce from the echo signals an indication representative of their frequencies, and therefore also representative of the angular position of the reflecting object.

The method and apparatus of the present invention therefore provide simultaneous wide angle radiation coverage without loss of object locating angle information. Thus scanning time is eliminated and an almost instantaneous indication of the position of an object may be obtained.

In addition the present invention provides a method and apparatus whereby the angle of radiation coverage and range of a radiation pattern may be selectively changed by adjustable means adapted to vary the frequency spectrum shape of the antenna energizing signal.

The invention can best be understood by referring to the accompanying drawings, in which FIG. 1 is a block diagram of a radar unit embodying the invention;

FIG. 2 is a graph of the frequency spectrum of an antenna energizing signal produced by the unit of FIG. 1; and FIG. 3 is a representation of the composite radiation pattern produced by the radar unit of FIG. 1 when energized by the signal represented in FIG. 2.

The radar unit of FIG. 1 employs an antenna 10 of the frequency directive type. Frequency directive antennas have been constructed of dipoles, slats, horns and other radiating devices. The antenna illustrated consists of a plurality of spaced dipoles 11a, 11b, etc. connected to points along the conductors of a transmission line 12. The length of transmission line between successive dipoles is large with respect to the spacing between the dipole elements. Preferably the transmission line is provided with a non-reflecting termination resistor 13.

In accordance with the invention the antenna is energized with a composite signal comprising a spectrum of different frequency increment signals. The increment signals simultaneously energize the antenna at different frequencies, thus causing the antenna to simultaneously radiate energy in different directions in accordance with its frequency directive characteristic. In effect each increment signal produces a differently directed incremental radiation beam, which beams combine to form a composite non-scanning radiation pattern.

A transmitter adapted to produce such a composite signal is illustrated in FIG. 1. The transmitter comprises a modulator 20, a wide band spectrum generator 21, a spectrum shaping filter 22, and a high power wide band amplifier 23.

Spectrum generator 21 is adapted to produce a spectrum of closely spaced different frequency signals. A noise generator may advantageously be employed for this purpose. The output of spectrum generator 21 is applied to a spectrum shaping filter 22 which is adapted to selectively attenuate the different frequency signals to produce the composite signal to be applied to antenna 10. The shaping filter and its function will be more fully described later in the specification. Wide band power amplifier 23 functions to amplify the output signal of shaping filter 22 to transmittible magnitudes.

Modulator 20 operates as it does in conventional radar units. The modulator applies time spaced triggering pulses to spectrum generator 21 to key it into operation for the brief duration of each pulse. Thus, the transmitter produces spaced composite signals of short duration.

The radar unit has the functions of transmitting a radiation pattern, receiving echo signals reflected from an object located within the radiation pattern, and producing from the echo signals indications representative of the position of the object. The radiation pattern is transmitted each time antenna 10 is energized by the spaced composite signals. Between signals the unit is adapted to receive reflected echo signals. ATR (anti-transmit-receive) switch 24 and TR (transmit-receive) switch 30 are employed to direct the transmitting and receiving functions. When a composite signal is produced TR switch 30 opens to disconnect the receiver portion of the unit (shown below the TR switch). At the same time the ATR switch 24 closes to couple the composite signal to antenna 10. Between composite signals the ATR switch opens to disconnect the transmitter and the TR switch closes to couple the receiver to the antenna.

Two types of receiving circuitry are illustrated in FIG. 1. Common to both is a low power wide band R.F. amplifier 31. One of the receiving circuits includes wide band receiver 32 the output of which is coupled into a range data circuit, adapted to indicate the distance position of an object from the antenna, and an angle data circuit, adapted to indicate the angular position of an object relative to the antenna. The range data circuit comprises a detector 34. The angle data circuit comprises a wide band frequency discriminator 33. The outputs of both the angle data and range data circuits are finally coupled into a radar indicator 35.

R.F. amplifier 31 and wide band receiver 32 operate conventionally to amplify a reflected echo signal. Both possess a wide band frequency characteristic to accommodate the spread of frequencies which may be possessed by a reflected echo signal.

The distance of a reflecting object from the antenna is indicated by a measurement of the time delay between the transmission of a composite energizing signal and the reception of its reflected echo signal. This time measurement is effected within radar indicator 35. Information as to the instant of signal transmission is supplied by coupling a timing pulse, synchronized with the triggering pulse from modulator 20, into the indicator. Information as to the instant of echo signal reception is supplied to the indicator by the range data circuit. Therein the received echo signal is demodulated into a unipolar output voltage by detector 34 before being coupled into the indicator. The indicator is adapted to measure the time delay between the two input signals and to produce therefrom a readable range display.

The angle data circuit functions to derive information from the echo signals as to the angular location of the reflecting object relative to the antenna, and to couple such information into the indicator 35. As has already been described, this information is provided by the frequency of the reflected echo signal. The angle data circuit is designed to convert the frequency of a reflected echo signal into a voltage having a proportional amplitude. Frequency discriminator 33 adapted to convert frequency variations at its input into proportional voltage amplitude variations at its output operates to perform this function. The discriminator possesses a wide band frequency characteristic, again to accommodate the echo signal frequency spread. The voltage output of the frequency discriminator is coupled into indicator 35 which is adapted to produce therefrom a readable angle display.

The other receiving circuit comprises a plurality of parallel circuit paths, each path being tuned to pass a different narrow band of frequencies. The number of parallel paths and the width of the frequency pass bands are selected to encompass the frequency spread of the reflected echo signals. Thus each path may be specifically adapted to operate on a comparatively small band of frequencies within the total frequency spread.

The circuit components of two of the parallel paths are illustrated in FIG. 1. Each path is similar and comprises a narrow band filter 40 or 44, a receiver 41 or 45, the output of which receiver is coupled into two parallel circuits, one including a detector 42 or 46, and the other including a discriminator 43 or 47. The paths differ in that their filters are tuned to pass different frequency bands, $F_1$, $F_2$, $F_3$, etc. Thus, the receiver and discriminator in each parallel path may be designed to operate on a relatively narrow frequency band and need not possess a wide frequency band characteristic.

The receiver, detector and discriminator of each path perform in the same manner as do the corresponding components in the previously described wide band receiving circuit. Range information furnished by the detector outputs is coupled into one common line. Angle information furnished by the discriminator outputs is coupled into another common line. The two common lines are finally coupled into a radar indicator 48 of the search and tracking variety to supply angle and range data thereto.

A feature of the present invention is the ease with which the shape of the composite radiation pattern may be selectively changed. In conventional systems the shape of a radiation pattern is determined and fixed by the design of the antenna employed. Thus locating systems which optimally should employ a variety of specialized pattern shapes are very often forced to utilize a single compromise shape.

With the present invention the shape of the radiation pattern is not fixed by the frequency directive characteristic of the antenna but is additionally determined by the frequency spectrum shape of the composite signal applied to the antenna.

FIGS. 2 and 3 illustrate the relationship of the spectrum shape of a composite energizing signal to the radiation pattern produced by the composite signal when applied to a frequency directive antenna. In the illustrated example, the frequency directive characteristic of the antenna is such that the angle at which an incremental beam is radiated therefrom increases with the frequency of the energizing signal. The angle of radiation coverage afforded by the radiation pattern is therefore determined by the frequency spread of the energizing spectrum. In the illustrated case the frequency spread is selected so that the radiation pattern extends through an angle of 60°.

The range of an incremental radiation beam is of course determined by the amplitude of the energizing signal producing the beam. Thus the amplitude envelope of the frequency spectrum determines the range to angle relationship of the radiation pattern. The amplitude envelope of the frequency spectrum of FIG. 2 is such that the amplitude of the increment signals becomes progressively smaller as their frequency increases. The range of the composite radiation pattern therefore becomes smaller as the angle with respect to antenna A increases.

With the present invention the problem of shaping a radiation pattern is reduced to that of shaping the energizing frequency spectrum both with respect to frequency spread and amplitude. In FIG. 1 the radar unit utilizes a spectrum shaping filter 22 for this purpose.

Assuming spectrum generator 21 to be a noise source, its output will comprise a random spread of different frequency signals. Spectrum shaping filter 22 operates to shape this output by selective attenuation of the different frequency signals. The filter is therefore designed with an attenuation characteristic which will produce the desired spectrum shape. For example, the frequency spectrum of FIG. 2 is produced by an attenuation characteristic which is smaller at the lower frequencies and becomes progressively greater as the frequencies increase.

A shaping filter is particularly advantageous for this purpose in that it can be provided with simple adjustable means for varying the shape of the energizing spectrum in order to permit the selection of a desired radiation pattern. Such means need only be adapted to vary the attenuation characteristic of the filter and may be switchable, tunable, or both, depending upon the degree of control desired.

Preferred embodiments of the invention have been described. Various changes and modifications may be made within the scope of the invention as set forth in the appended claims.

I claim:

1. An object locating system comprising, a frequency directive antenna characterized by a radiation beam which changes direction in response to a change in the frequency of the energizing signal coupled to said antenna, an electrical transmitter including, generating circuitry for producing a spectrum of different frequency signals, a spectrum shaping filter for selectively attenuating the different frequency signals of the said spectrum in accordance with its attenuation characteristic to produce a composite energizing signal comprising a shaped spectrum of different frequency increment signals, and circuit means for coupling said composite energizing signal to said frequency directive antenna to produce with each increment signal a differently directed incremental radiation beam in accordance with the frequency directive characteristic of the said antenna, the combination of which said incremental radiation beam forms a non-scanning radiation pattern, and an electrical receiver coupled to said frequency directive antenna to be responsive to echo signals reflected from an object located within said non-scanning radiation pattern and received at said antenna, the frequency of which said echo signals is representative of the angular position of the said object relative to the said antenna, said receiver including, a frequency discriminator circuit for converting frequency variations at its input into proportional voltage amplitude variations at its output, circuit means for applying the said echo signals received at the said antenna to the input of said frequency discriminator circuit to produce at the output thereof voltages which are proportional to the frequency of the said echo signals, and an indicating device coupled to the output of said frequency discriminator circuit for producing from the said output voltages an indication of the angular position of the said object relative to the said antenna.

2. An object locating system comprising, a frequency directive antenna characterized by a radiation beam which changes direction in response to a change in the frequency of the energizing signal coupled to said antenna, modulator circuit means for producing trigger pulses at the output thereof, an oscillator circuit coupled to receive the output signals from said modulator circuit means for producing a spectrum of different frequency signals in accordance with said trigger pulses, a spectrum shaping filter coupled for receiving said spectrum and designed for attenuating the different frequency signals of the said spectrum in accordance with its attenuation characteristic to produce a composite energizing signal comprising a shaped spectrum of different frequency increment signals, circuit means for coupling said composite energizing signal to said frequency directive antenna to produce with each increment signal a differently directed incremental radiation beam in accordance with the frequency directive characteristic of said antenna, the combination of which said incremental radiation beams forms a non-scanning radiation pattern, sensing means coupled to said antenna to be responsive to echo signals reflected from an object located within said non-scanning radiation pattern and received at said antenna, the frequency of said echo signals being representative of the angular position of said object relative to said antenna, a frequency discriminator circuit for converting frequency variations at its input into proportional voltage amplitude variations at its output, detector means, means for coupling the said echo signals from said sensing means to said frequency discriminator circuit and to said detector means, said detector means being designed for producing output pulses related in time to the range of said object, and an indicating device coupled for receiving the output signals from said modulator circuit means, said frequency discriminator circuit and said detector means; said indicating device being constructed and arranged for correlating the said outputs coupled thereto so as to produce an indication of the relative position of said object with respect to said antenna.

3. An object locating system in accordance with claim 2 which includes a plurality of data processing sections each including a narrow-band filter, a detector means and a discriminator means, the inputs of said detector means and said discriminator means being commonly coupled to the output of said narrow-band filter, each said data processing section having the input of the said narrow-band filter thereof coupled for receiving said echo signals from said sensing means, the frequency increment passed by any one of said narrow-band filters being at least partially displaced from the frequency increment passed by any other of said narrow-band filters but being within the operating frequency range of said antenna, and a second indicating means coupled to receive the output signals of said data processing sections and said modulator circuit means for correlating the said outputs coupled thereto so as to produce an indication of the range and angular position of said object with respect to said antenna.

References Cited in the file of this patent

UNITED STATES PATENTS

| | | |
|---|---|---|
| 2,422,691 | Mason | June 24, 1947 |
| 2,433,804 | Wolff | Dec. 30, 1947 |
| 2,537,574 | Crosby | Jan. 9, 1951 |
| 2,901,747 | Sunstein | Aug. 25, 1959 |
| 3,029,429 | Rodgers | Apr. 10, 1962 |

FOREIGN PATENTS

| | | |
|---|---|---|
| 802,373 | Great Britain | Oct. 1, 1958 |
| 862,690 | Great Britain | Mar. 15, 1961 |